(12) United States Patent
Antony

(10) Patent No.: US 10,346,215 B2
(45) Date of Patent: *Jul. 9, 2019

(54) REPLICATION OF A VIRTUALIZED COMPUTING ENVIRONMENT TO A COMPUTING SYSTEM WITH OFFLINE HOSTS

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,960

(22) Filed: Mar. 1, 2018

(65) Prior Publication Data

US 2018/0189108 A1 Jul. 5, 2018

Related U.S. Application Data

(63) Continuation of application No. 14/738,963, filed on Jun. 15, 2015, now Pat. No. 9,910,712.

(30) Foreign Application Priority Data

Mar. 26, 2015 (IN) .......................... 1572/CHE/2015

(51) Int. Cl.
*G06F 3/06* (2006.01)
*G06F 9/50* (2006.01)
*G06F 9/455* (2018.01)

(52) U.S. Cl.
CPC ............ *G06F 9/5055* (2013.01); *G06F 3/065* (2013.01); *G06F 3/067* (2013.01); *G06F 3/0619* (2013.01); *G06F 9/45558* (2013.01); *G06F 2009/45562* (2013.01); *G06F 2009/45579* (2013.01); *G06F 2009/45583* (2013.01)

(58) Field of Classification Search
CPC combination set(s) only.
See application file for complete search history.

(56) References Cited

U.S. PATENT DOCUMENTS

2015/0379038 A1 12/2015 Nikolov

*Primary Examiner* — Yong J Choe
(74) *Attorney, Agent, or Firm* — Loza & Loza, LLP

(57) ABSTRACT

In an example, a method of replication between computing systems includes replicating virtual machine files from primary storage in a primary computing system to secondary storage in a secondary computing system. The virtual machine files implement a plurality of virtual machines in the primary computing system and a plurality of replica virtual machines in the secondary computing system. The method further includes replicating configuration data, from virtualization software in the primary computing system to secondary virtualization software installed on a host computer in the secondary computing system, through a platform management system in the host computer while the host computer is in a low-power state.

20 Claims, 5 Drawing Sheets

REPLICATION OF A VIRTUALIZED COMPUTING ENVIRONMENT TO A COMPUTING SYSTEM WITH OFFLINE HOSTS

CROSS-REFERENCE TO RELATED APPLICATIONS

This application claims priority to U.S. application Ser. No. 14/738,963, filed Jun. 15, 2015 (issued as U.S. Pat. No. 9,910,712), which claims benefit under 35 U.S.C. 119(a)-(d) to Foreign Application Serial No. 1572/CHE/2015 filed in India on Mar. 26, 2015, which are both incorporated by reference herein in their entirety.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources of a virtualization platform in a cloud environment. The virtualization platform can include a large number of host servers each installed with virtualization software that support IaaS constructs, such as virtual machines, logical networks, and the like.

The virtualization platform of a cloud computing system can be used to provide disaster recovery (DR). Virtual machines executing on a production computing system can be replicated to the virtualization platform of the cloud computing system. The replicated virtual machines in the cloud computing system can be brought online in case of failure in the production computing system (failover). During replication and prior to failover, the target host servers in the cloud computing are powered on to allow for management of the installed virtualization software. To support the replication operation, the target host servers in the cloud computing system are powered on even if such host servers do not support an active virtual machine workload (e.g., executing virtual machines). Keeping a large number of host servers powered on consumes a considerable amount of resources in the cloud computing system, including power, energy, datacenter (e.g., cooling, network, etc.), and like-type resources.

SUMMARY

One or more embodiments provide techniques for replication of a virtualized computing environment to a computing system with offline hosts. In an embodiment, a method of replication between computing systems includes replicating virtual machine files from primary storage in a primary computing system to secondary storage in a secondary computing system. The virtual machine files implement a plurality of virtual machines in the primary computing system and a plurality of replica virtual machines in the secondary computing system. The method further includes replicating configuration data, from virtualization software in the primary computing system to secondary virtualization software installed on a host computer in the secondary computing system, through a platform management system in the host computer while the host computer is in a low-power state.

Further embodiments include a computer system and a non-transitory computer-readable storage medium comprising instructions that cause a computer system to carry out the above method above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
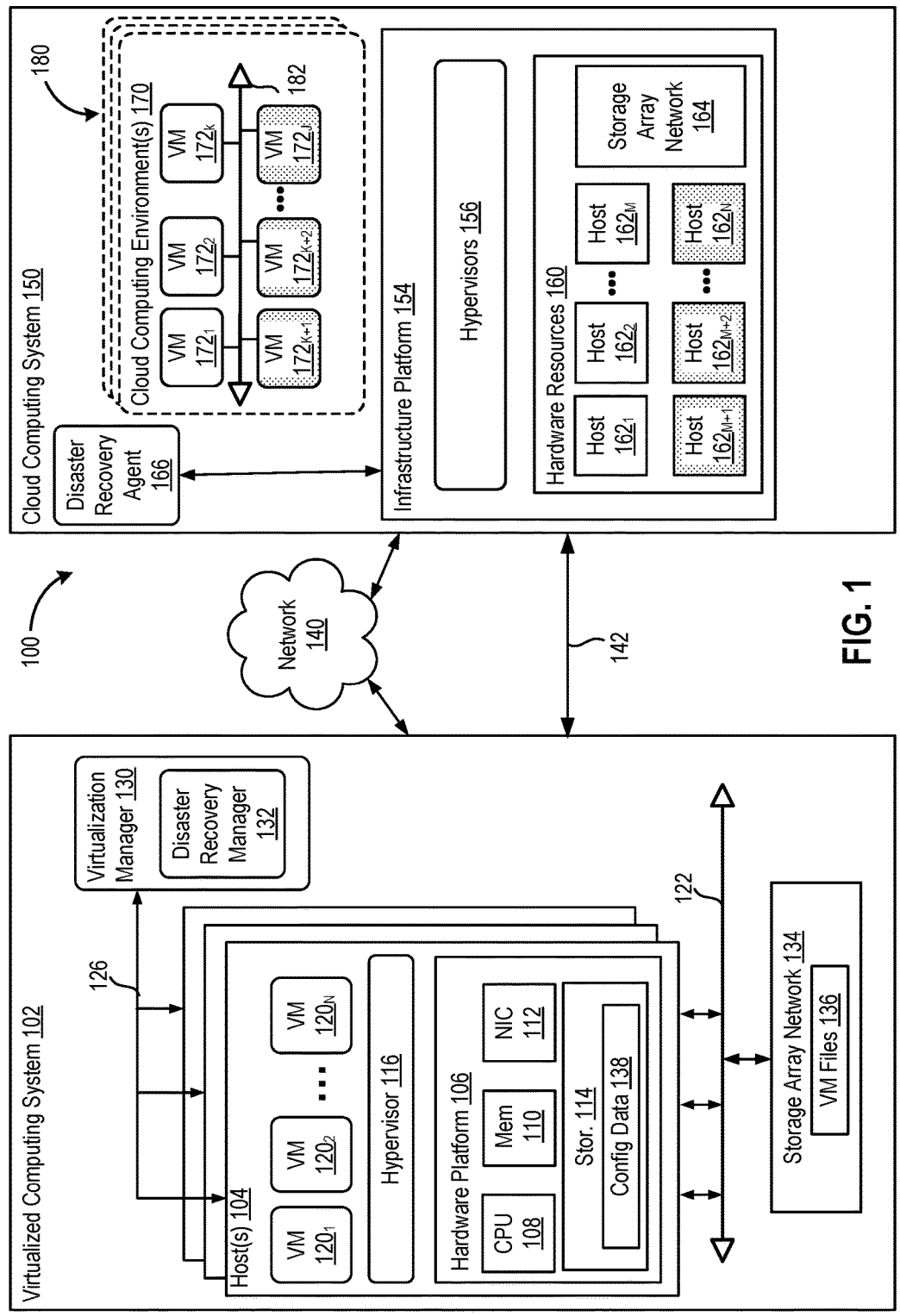
FIG. 1 is a block diagram of a computing system in which one or more embodiments of the present disclosure may be utilized.

FIG. 1 is a block diagram of a computing system 100 in which one or more embodiments of the present disclosure may be utilized. Computing system 100 includes a virtualized computing system 102 and a cloud computing system 150. Virtualized computing system 102 is also referred to as a "primary computing system" or a "production computing system." In operation, a protected virtualized computing environment in virtualized computing system 102 is replicated to cloud computing system 150 to implement a disaster recovery (DR) scheme. Cloud computing system 150 is also referred to as a "secondary computing system." In general, "replication" encompasses copying data from the primary computing system to the secondary computing system continuously or periodically so that a resulting virtualized computing environment in the secondary computing system is a replica or substantial replica of the protected virtualized computing environment in the primary computing system.

Virtualized computing system 102 can communicate with cloud computing system 150 over a network 140 (e.g., a shared network, such as the public Internet), over a direct connection 142 (e.g., a private point-to-point link), or over both network 140 and direction connection 142. Virtualized computing system 102 includes one or more host computer systems 104 (also referred to as "hosts 104"). Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112 (also referred to as a "network interface controller (NIC) 112"), storage 114 (also referred to as "local storage 114"), and other I/O devices such as, for example, a mouse and keyboard (not shown). Each of CPUs 108 is configured to execute instructions, for example, executable instructions that perform one or more operations described herein and may be stored in memory 110 and in local storage 114. Memory 110 is a device allowing information, such as executable instructions, cryptographic keys, virtual disks, configurations, and other data, to be stored and retrieved. Memory 110 may include, for example, one or more random access memory (RAM) modules, read only memory (ROM), or a combination thereof. Network interface 112 enables each host 104 to communicate with another device via a communication medium, such as a network 122 (e.g., local area network (LAN)) within virtualized computing system 102. Network interface 112 may be one or more network adapters. Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples each host 104 to one or more storage arrays, such as a storage area network (SAN) or a network-attached storage (NAS), as well as other network data storage systems. In the example, hosts 104 are configured for communication with SAN 134 over network 122.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as "virtualization software", which enables sharing of the hardware resources of host 104 by VMs 120. In the example, the virtualization software comprises a hypervisor 116. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of a host 104 or directly on hardware components of a host 104.

Each of VMs 120 is implemented by a set of files, such as a VM configuration file, virtual disk file(s), log file(s), snapshot file(s), and the like ("VM Files"). An example VM configuration file is a .vmx file in a VMware ESXi™ hypervisor implementation. In general, a VM configuration file can be a text file that includes various defined parameters specifying local behavior of the VM (e.g., the number of CPUs assigned, the amount of memory assigned, the guest OS deployed therein, etc.). An example virtual disk file is a .vmdk file in a VMware ESXi™ hypervisor implementation. In general, a virtual disk file is a container file for a virtual hard disk drive. The VM files are stored in one or more datastores accessible by hypervisor 116. Datastores can be stored on local storage 114 accessible by a single host 104 ("local datastores"), in SAN 134 accessible by multiple hosts 104 ("shared datastores"), or both. In the example shown in FIG. 1, SAN 134 includes VM files 136 that implement VMs 120.

Hypervisor 116 is implemented by a set of persistent files stored as part of a system image ("hypervisor system image"). A hypervisor system image includes, among other files, boot files for booting hypervisor 116; installation files for implementing a kernel, kernel modules, device drivers, and applications/services of hypervisor 116; and configuration files that establish a persistent configuration of hypervisor 116. Notably, the configuration files in the hypervisor system image include configuration data for hypervisor 116, such as network address, hostname, and the like, as well as an inventory of VMs registered with hypervisor 116. The configuration data can also include information related to global behavior of VMs 120, such as which VMs 120 belong to specific groups (e.g., clusters, resource groups, etc.), which VMs 120 are enabled for disaster recovery (DR), which VMs 120 are enabled for high-availability (HA), which VMs 120 are enabled for replication, and the like. Hypervisor 116 can save the configuration data on persistent storage (e.g., with hypervisor system image) so that the configuration data persists when hypervisor 116 is shutdown or rebooted. In the example, local storage 114 stores configuration data 138. Configuration data 138 can include configuration data for hypervisor 116. Configuration data 138 can also include configuration data for global behavior of VMs 120.

Virtualized computing system 102 includes a virtualization management module (depicted in FIG. 1 as virtualization manager 130) that may communicate with the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter Server™ product made available from VMware, Inc. Virtualization manager 130 is configured to carry out administrative tasks for virtualized computing system 102, including managing hosts 104, managing VMs 120 running within each host 104, provisioning VMs, migrating VMs from one host to another host, and load balancing between hosts 104.

In one embodiment, virtualization manager 130 includes a disaster recovery manager 132 configured to setup and manage a DR scheme for the virtualized environment of virtualized computing system 102. Disaster recovery manager 132 can be used designate protected virtual machines of VMs 120. Based on the designated protected virtual machines, disaster recovery manager 132 initiates replication of a virtualized computing environment encompassing the protected virtual machines ("protected virtualized computing environment") to cloud computing system 150. Replication includes replication of VM files that implement the protected virtual machines (e.g., VM files 136) and replication of configuration data for hypervisor 116 and/or VMs 120 (e.g., configuration data 138). As described herein, the replication can be executed while hosts in cloud computing system 150 are in a low-power state (generally referred to as "offline hosts"). In another embodiment, disaster recovery manager 132 can be separate from virtualization manager 130. For example, disaster recovery manager 132 can be a computer program that resides and executes in a central server, which may reside in virtualized computing system 102, or alternatively, running as a VM in one of hosts 104.

Cloud computing system 150 includes an infrastructure platform 154 upon which cloud computing environment(s) 170 can be executed. Each cloud computing environment 170 includes a plurality of virtual machines $172_1$ through $172_K$ (collectively VMs 172). Cloud computing environment(s) 170 can also include other virtual resources, such as one or more virtual networks 182 used to communicate between VMs 172. Virtual machines 172 provide abstractions of processor, memory, storage, and networking resources of hardware resources 160. Virtual networks 182 provide abstractions of networks, such as local area networks (LANs), wide area networks (WANs), and the like. At a given time, some VMs 172 are "active" (e.g., executing) while other VMs 172 are "inactive" (e.g., not executing). For example, VMs 172 that are replicas of VMs 120 protected in virtualized computing system 102 are inactive while VMs 120 are active. As shown in FIG. 1, VMs $172_1$ through $172_J$ are inactive (where J is a positive integer less than K). In an example, a cloud computing environment 170 can provide a virtualized computing environment 180 replicated from virtualized computing system 102. In such case, unless failover has occurred, all VMs 172 in virtualized computing environment 180 are inactive.

Infrastructure platform 154 includes hardware resources 160 and virtualization software (e.g., hypervisors 156). Hardware resources 160 include computing resources, storage resources, network resources, and the like. In the embodiment shown, hardware resources 160 include a plurality of host computers $162_1$ through $162_N$ (collectively host computers 162) and a storage array network (SAN) 164. Hardware resources 160 are configured in a manner to provide hypervisors 156 that support the execution of virtual machines 172 across host computers 162. Hypervisors 156 can be implemented similarly to hypervisors 116 in virtualized computing system 102.

At a given time, some host computers 162 are powered on while other host computers 162 are in a low-power state (e.g., powered off). For example, host computers that are not hosting active VMs can be put into a low-power state to conserve electricity and other resources in cloud computing system 150. As shown in FIG. 1, host computers $162_1$ through $162_M$ can be powered on, while host computers $162_{M+1}$ through $162_N$ can be in a low-power state (where M is positive integer less than N). In embodiments described herein, an application (e.g., disaster recovery manager 132 and/or virtualization manager 130) can access virtualization software on host computers 162 through platform management systems in host computers 162. A platform management system is an autonomous computing subsystem in a host computer that provides management and monitoring capabilities independent from the host's CPU, firmware, and OS (sometimes referred to as "out-of-band management"). In some embodiments, a platform management system is a subsystem having its own processor, memory, network connection, and access to the system bus of the host. Notably, a platform management system is operable even when a host computer is in a low-power state. As such, a client application can access virtualization software through platform management systems of host computers 162 regardless of whether hosts 162 are powered on or in a low-power state. Thus, in a DR scheme, host computers 162 can be kept in a low-power state (e.g., powered off) during replication and prior to failover in order to conserve resources (e.g., power resources, network resources, computing resources, etc.), which would otherwise be spent operating redundant VMs and hosts.

Cloud computing system 150 can also include a disaster recovery agent 166 that cooperates with disaster recovery manager 132 to orchestrate the DR scheme (e.g., replication of VM files 136 and configuration data 138). Virtualization manager 130 and/or disaster recovery manager 132 can access hosts 162 through disaster recovery agent 166. In another embodiment, virtualization manager 130 and/or disaster recovery manager 132 can access hosts 162 directly over network 140 and/or direct connection 142.

Computing system 100 is one example system that be used to replicate a protected virtualized computing environment to computing system having offline hosts. In general, using the techniques described herein, a protected virtualized computing environment can be replicated between a primary computing system and a secondary computing system. The hosts in the secondary computing system used to support the replicated virtualized computing environment can be kept in a low-power state (e.g., offline). The secondary computing system can be a cloud computing system, as described in the embodiments above, or any other type of computing system having a plurality of host computers.

Figure 2:
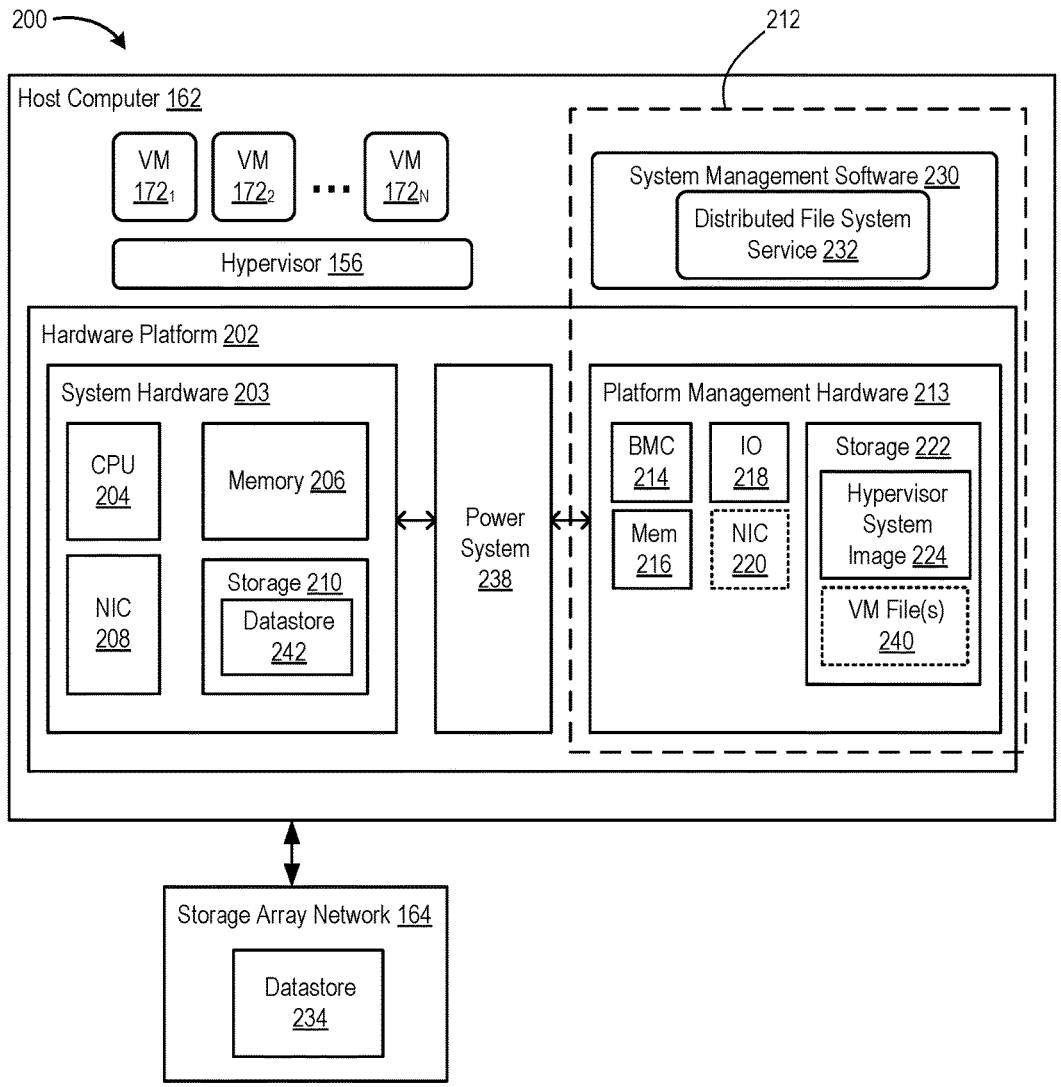
FIG. 2 is a block diagram showing an example of a computer system.

FIG. 2 is a block diagram showing an example of a computer system 200. In an embodiment, computer system 200 can be a subset of the cloud computing system 150 shown in FIG. 1 (or any other secondary computing system) and includes a host computer 162 and the SAN 164. Host computer 162 includes a hardware platform 202. Hardware platform 202 includes system hardware 203 comprising conventional components of a computing device, such as one or more CPUs 204, system memory 206, a network interface 208, storage 210, and other input/output (TO) and support devices (not shown). CPUs 204 can include one or more microprocessors known in the art. System memory 206 includes device(s) that store information and can include, for example, RAM, ROM, or a combination thereof. Network interface 208 can include one or more network adapters (e.g., NICs). Storage 210 includes local storage devices, such as hard disks, flash memory modules, solid state disks, optical disks, and the like. Storage 210 can also include interface(s) configured for communication with one or more network data storage systems, such as host bus adapter(s) configured for communication with SAN 164 or other type of data storage system (e.g., NAS). Hardware platform 202 includes a power system 238 configured to supply power to the system hardware 203.

Hardware platform 202 also includes platform management hardware 213 of a platform management system 212 configured to manage and monitor system hardware 203. Platform management hardware 213 comprises a baseboard management controller (BMC) 214, memory 216, IO interfaces 218, and storage 222. In some embodiments, platform management hardware 213 can include its own network interface 220 (e.g., NIC). Alternatively, platform management hardware 213 can access network interface 208 using IO interfaces 218, and network interface 220 can be omitted. BMC 214 can include a microcontroller, microprocessor, or the like, or a plurality of such devices. Memory 216 can include RAM, ROM, or a combination thereof. IO interfaces 218 can include interfaces to various types of busses, such as an I2C bus, a system management bus (SMBus), a low-pin count (LPC) bus, an intelligent platform management interface (IPMI) bus, serial bus, or the like, or combinations thereof. Storage 222 can include various types of nonvolatile storage devices, such as any type of secure digital (SD) memory, SSD device, hard disc drive, or the like, as well as combinations thereof. Storage 222 can be accessible by system hardware 203 through IO interfaces 218. For example, CPUs 204 can access files in storage 222 through IO interfaces 218. Platform management system 212 can be integrated as part of a mainboard of host computer 162 having the CPUs 204, can be a peripheral card installed on a mainboard of host computer 162 having the CPUs 204, or can be a combination thereof. Example platform management systems that can be adapted for use in embodiments described herein include a Dell® Remote Assistance Card (DRAC) available from Dell Inc. of Round Rock, Tex. and an Integrated Lights-Out (iLO) controller available from Hewlett-Packard Company of Palo Alto, Calif. Power system 238 is configured to supply power to platform management system 212.

Hardware platform 202 can have various power states, including a "powered on" state and one or more "low-power states" (also referred to as "offline states"). As used herein, the power state of hardware platform 202 corresponds to the power state of host computer 162. In the powered on state, the various devices and components of system hardware 203 are on and operating at full power. For example, CPU 204 is on and executing instructions; memory 206 is on, storing data, and processing read and write transactions; network interface 208 is on and communicating data; and storage 210 is on and processing read and write transactions. In the powered on state, system hardware 203 consumes main power supplied by power system 238. In the powered on state, hypervisor 156 executes on system hardware 203.

An example low-power state is the "powered off" state. In the powered off state, the various devices and components of system hardware 203 are off or only consuming low power. For example, CPU 204, memory 206, network interface 208, and storage 210 can each be off and consuming no power. In some cases, one or more devices or components in system hardware 203 can consume low power when system hardware 203 is powered off. For example, network interface 208 can consume low power when system hardware 203 is powered off (e.g., to support a wake-on-LAN feature). Thus, when hardware platform 202 is powered off, system hardware 203 can consume no power or only auxiliary power from power system 238. Hypervisor 156 cannot execute when hardware platform 202 is powered off.

In contrast to system hardware 203, platform management hardware 213 is on and operating at full power regardless of whether hardware platform 202 is powered on or in a low-power state (e.g., powered off). Thus, system management software 230 executes on platform management hardware 213 in both the powered on state and in any low-power state (e.g., powered off). This independence from the system hardware's power state enables platform management hardware 213 to be used by an administrator to remotely manage the hosts in lieu of physical presence. As described below, the abilities of platform management hardware 213 may be adapted to provide replication and disaster recovery functionality. In some embodiments, platform management hardware 213 can access some resources in system hardware 203 while hardware platform 202 is powered off (e.g., network interface 208). Platform management system 212 can be used to transition hardware platform 202 from one power state to another.

In an embodiment, hardware platform 202 can transition to one or more intermediate power states between the powered on state and the powered off state. That is, hardware platform 202 can have a plurality of low-power states (including the powered off state), each consuming a different amount of power. For example, hardware platform 202 can comply with the Advanced Configuration and Power Interface (ACPI) specification or the like known in the art. ACPI defines various global power states, device power states, and CPU power states. Global power states include G0/S0 (working), G1 (sleeping), G2/S5 (soft off), and G3 (mechanical off). The powered on state as defined herein encompasses the G0/S0 (working) ACPI state. The powered off state as defined herein encompasses the G2/S5 (soft off) and G3 (mechanical off) states. Notably, if the hardware platform 202 is in a "mechanical off" state, then platform management hardware 213 can include a separate power source in power system 238 that can continue to supply power (e.g., a battery or other power supply that is not mechanically switched off). Other low-power states encompass the G1 (sleeping) states, such as S1 (power on suspend), S2 (CPU powered off), S3 (suspend to RAM), and S4 (hibernation). Notably, in any of the G1 (sleeping) states, hypervisor 156 cannot execute on system hardware 203, but system management software 230 continues to execute on platform management hardware 213.

A hypervisor 156 executes on system hardware 203 of hardware platform 202. When hardware platform 202 is in a low-power state, hypervisor 156 is not executing (e.g., hypervisor 156 is offline). Hypervisor 156 supports VMs 172, which are replicas of VMs in a primary computing system in a DR scheme. VMs 172 can be implemented by VM files, which are replicated from a primary computing system in a DR scheme. The replicated VM files are stored in a datastore. In an embodiment, storage 210 of system hardware 203 can store a datastore 242 having VM files for VMs 172. Alternative to, or in addition to datastore 242, SAN 164 can store a datastore 234 having VM files for VMs 172. Datastore 242 comprises a local datastore in host computer 162, whereas datastore 234 comprises a remote datastore in SAN 164 (which can also be a shared datastore shared among other host computers). In an embodiment, storage 222 in platform management hardware 213 can also store VM file(s) 240 for VMs 172.

Platform management system 212 includes system management software 230 executing on platform management hardware 213. System management software 230 can include instructions executable by BMC 214. System management software 230 can perform various operations to manage and monitor system hardware 203 that are well known in the art. In an embodiment, system management software 230 also provides access to files implementing hypervisor 156, as described below.

In an embodiment, storage 222 of platform management hardware 213 stores a hypervisor system image 224 for hypervisor 156. Hypervisor system image 224 is a collection of persistent files used to implement hypervisor 156 arranged within a particular hierarchy. In an embodiment, hypervisor system image 224 is organized into plurality of logical storage units, such as partitions, volumes, or the like, on storage 222. Files of hypervisor system image 224 can be divided among the local storage units. One of the logical storage units can include configuration files for hypervisor 156 and VMs 172, as discussed above. Another logical storage unit can include installation files for hypervisor 156. Still other logical storage units can include boot files, scratch files, and the like. Another logical storage unit can include VM file(s) 240. Distributed file system service 232 can export at least a portion of hypervisor system image 224. The exported portion can include logical storage unit(s) having the configuration files and/or installation files for hypervisor 156. Distributed file system service 232 can also export logical storage unit(s) having VM file(s) 240.

When hardware platform 202 is powered on, CPUs 204 in system hardware 203 can access hypervisor system image 224 to load and boot hypervisor 156. When system hardware platform 202 is in a low-power state (e.g., powered off), platform management system 212 provides access to hypervisor system image 224 and/or VM file(s) 240. System management software 230 can execute a distributed file system service 232 that exports at least a portion of hypervisor system image 224 and/or VM file(s) 240 for access by remote systems. In an embodiment, distributed file system service 232 comprises a network file system (NFS) service, but other types of file services may be used, such as server message block (SMB), common internet file system (CIFS), or the like. In an embodiment, distributed file system service 232 can receive connections from remote systems over a network. Distributed file system service 232 can require credentials for authentication from remote systems to allow access to hypervisor system image 224 and/or VM file(s) 240.

Figure 3:
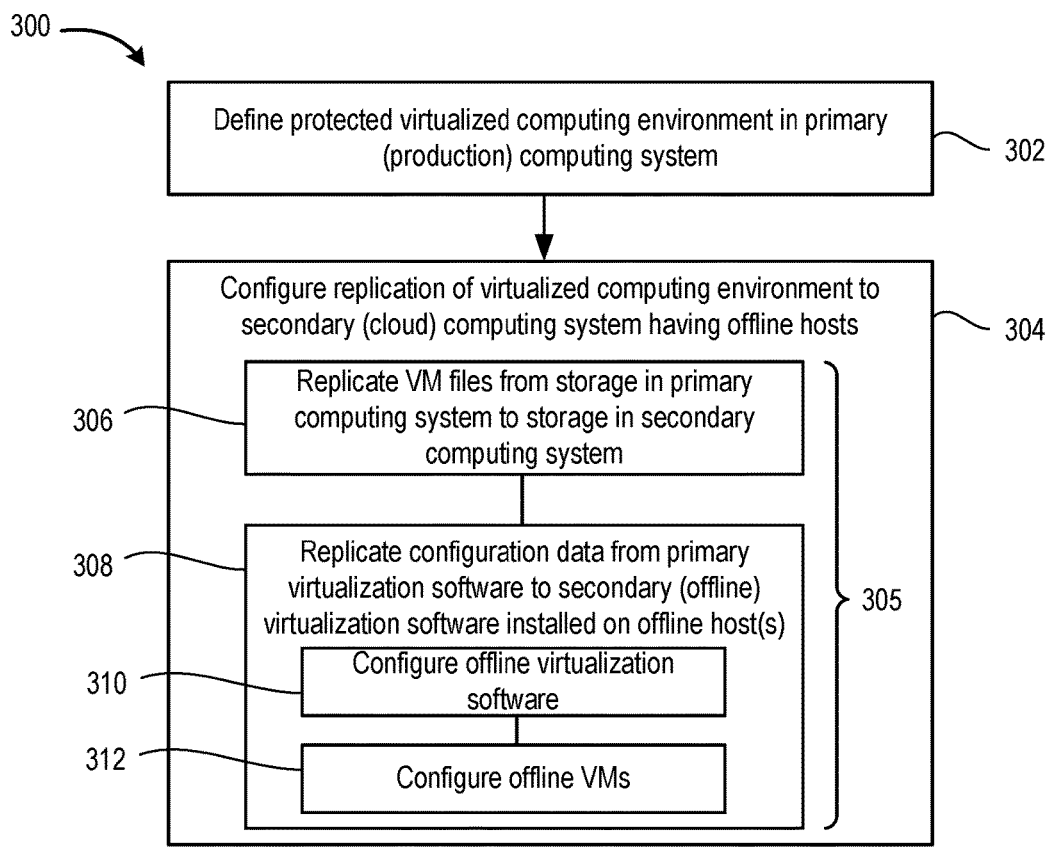
FIG. 3 is a flow diagram depicting a method of implementing a disaster recovery (DR) scheme according to an embodiment.

FIG. 3 is a flow diagram depicting a method 300 of implementing a DR scheme according to an embodiment. Method 300 can be performed by a system comprising a primary computing system and secondary computing system. By way of example, aspects of the methods described below are described with respect to computing system 100 and computer system 200 of FIGS. 1 and 2. In particular, disaster recovery manager 132, either alone or in combination with disaster recovery agent 166, performs various operations of the methods described below.

Method 300 begins at block 302, where an administrator defines a protected virtualized computing environment in a primary computing system (e.g., virtualized computing system 102). The administrator can define the protected virtualized computing environment using a software application, such as disaster recovery manager 132. The protected virtualized computing environment includes protected VMs (e.g., VMs 120) and protected virtualization software on which the protected VMs execute (e.g., hypervisor 116). The protected virtualized computing environment can span across one or more host computers in the primary computing system (e.g., hosts 104) and can include one or more storage systems (e.g., SAN 134).

At block 304, disaster recovery manager 132 configures replication of the protected virtualized computing environment to a secondary computing system having offline hosts (e.g., cloud computing system 150 having hosts 162 in a low-power state). Block 304 can include a method 305 of replication between computing systems.

Method 305 begins at block 306, where VM files are replicated from storage in the primary computing system to storage in the secondary computing system. For example, VM files 136 in SAN 134 can be replicated to SAN 164 in cloud computing system 150. The replication of VM files can be orchestrated by disaster recovery manager 132. In an embodiment, disaster recovery manager 132 can direct hypervisor 116 in each of hosts 104 to implement the replication ("hypervisor-based replication"). In another embodiment, disaster recovery manager 132 can direct SAN 134 to implement the replication ("storage-based replication"). In general, replication includes the transfer of a complete copy of VM files 136 to SAN 164 in a first operation, and then the transfer of only changed VM files 136 in subsequent operations.

Method 305 then proceeds to block 308, where configuration data for primary virtualization software is replicated to configure secondary (offline) virtualization software installed on the offline hosts in the secondary computing system. For example, configuration data 138 for hypervisors 116 can be replicated to hosts 162 in cloud computing system 150 to configure hypervisors 156. Replication of configuration data 138 to hosts 162 that are offline can be performed using platform management systems (e.g., platform management system 212), as described above. Replication of configuration data 138 can include, at block 310, replication of configuration data to configure offline virtualization software (e.g., hypervisor configuration data to configure hypervisors 156). Replication of configuration data 138 can include, at block 312, replication of configuration data to configure VMs (e.g., configure VMs 172 that are replicas of VMs 120).

Figure 4:
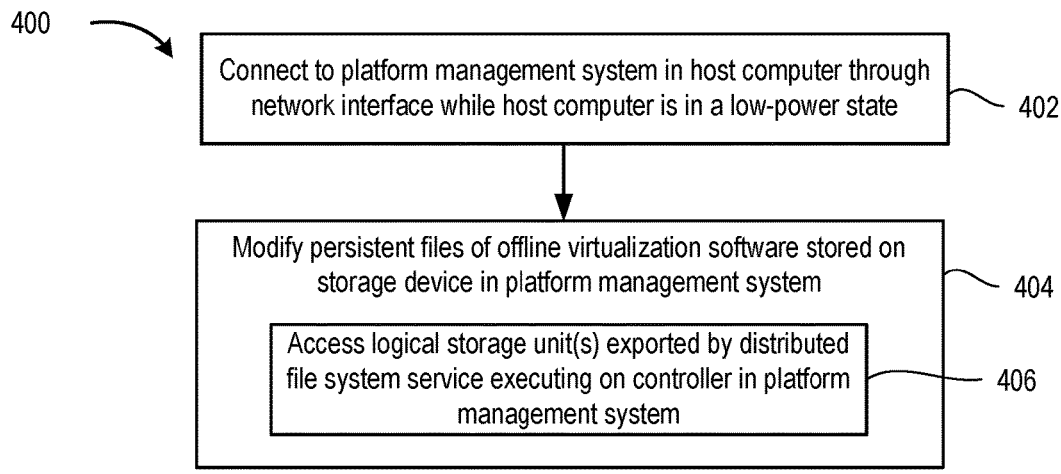
FIG. 4 is a flow diagram depicting a method of configuring virtualization software on an offline host according to an embodiment.

FIG. 4 is a flow diagram depicting a method 400 of configuring virtualization software on an offline host according to an embodiment. Disaster recovery manager 132 can, either alone or in combination with disaster recovery agent 166, perform method 400 to configure a hypervisor 156 installed on a host computer 162 that is in a low-power state. Method 400 begins at block 402, where disaster recovery agent 166 connects to platform management system 212 of host computer 162 through a network interface (e.g., NIC 220) while host computer 162 is in a low-power state (e.g., offline).

At block 404, disaster recovery agent 166 modifies persistent files of offline virtualization software (e.g., hypervisor 156) stored on storage device 222 in platform management system 212. As discussed above, such modification can include various hypervisor configuration changes, VM configuration changes, and the like. The modification of the persistent files can include, at block 406, access of logical storage unit(s) exported by distributed file system service 232 executing on BMC 214 in platform management system 212. Disaster recovery manager 132 can perform method 400 for various hosts 162 in cloud computing system 150 while such hosts 162 are offline in order to replicate configuration data 138.

Figure 5:
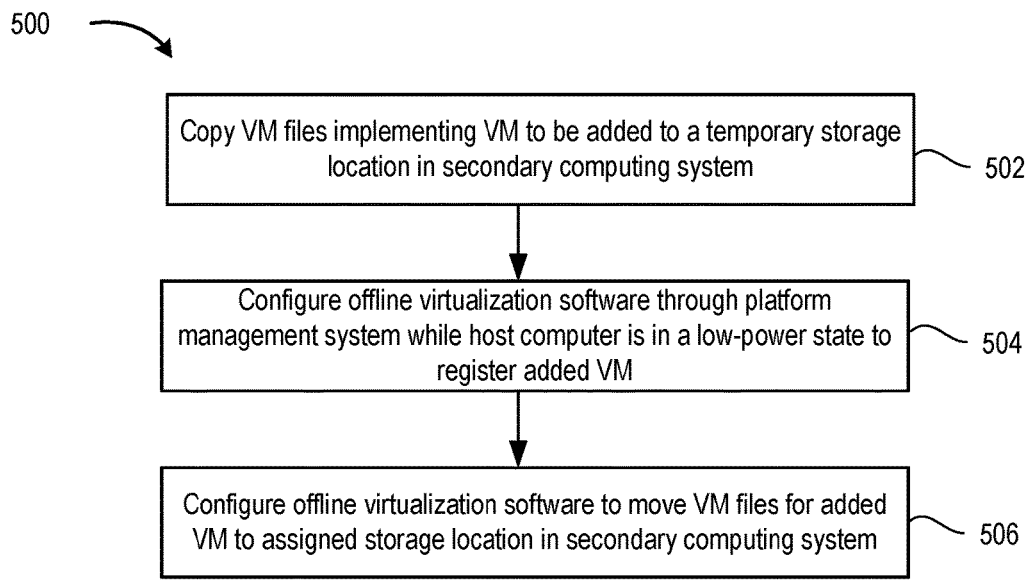
FIG. 5 is a flow diagram depicting a method of adding a new virtual machine (VM) to a protected group of VMs in a protected virtualized computing environment according to an embodiment.

FIG. 5 is a flow diagram depicting a method 500 of adding a new VM to the protected group of VMs in the protected virtualized computing environment according to an embodiment. Disaster recovery manager 132 can, either alone or in combination with disaster recovery agent 166, perform method 500 to add a VM 120 to the protected virtualized computing environment in virtualized computing system 102. Method 500 begins at block 502, where disaster recovery manager 132 copies VM files implementing the VM to be added to a temporary storage location in the secondary computing system (e.g., cloud computing system 150). In an embodiment, the temporary storage location can be on storage device 222 in platform management system 212 of a host computer 162. In another embodiment, the temporary storage location can be in SAN 164.

At block 504, disaster recovery manager 132 configures offline virtualization software (e.g., a hypervisor 156) through platform management system 212 while a host computer 162 is in a low-power state to register the added VM. That is, the added VM is added to the inventory of a hypervisor 156 while hypervisor 156 is offline by accessing persistent files of hypervisor 156 using the platform management system 212.

At block 506, disaster recovery manager 132 configures offline virtualization software (e.g., a hypervisor 156) to move the VM files for the added VM to an assigned storage location in the secondary computing system. The move operation can be performed during or after boot of hypervisor 156 when host computer 162 is powered on. The assigned storage location can be on local storage 210 or on SAN 164.

Figure 6:
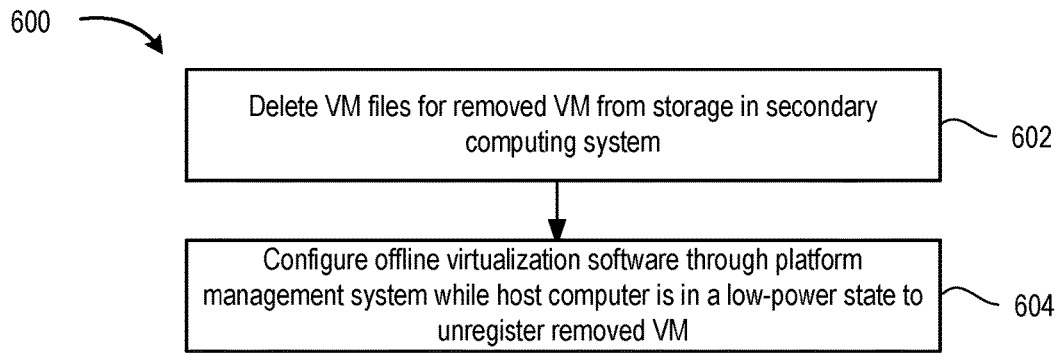
FIG. 6 is a flow diagram depicting a method of removing a VM from a protected group of VMs in a protected virtualized computing environment according to an embodiment.

FIG. 6 is a flow diagram depicting a method 600 of removing a VM from a protected group of VMs in the protected virtualized computing environment according to an embodiment. Disaster recovery manager 132 can, either alone or in combination with disaster recovery agent 166, perform method 600 to remove a VM 120 from the protected virtualized computing environment in virtualized computing system 102. Method 600 begins at block 602, where disaster recovery manager 132 deletes VM files for the removed VM from storage in the secondary computing system (e.g., cloud computing system 150). For example, disaster recovery manager 132 can delete specific replicated VM files corresponding to the removed VM from SAN 164 in cloud computing system 150.

At block 604, disaster recovery manager 132 can configure offline virtualization software (e.g. a hypervisor 156) through platform management system 212 while a host computer 162 is in a low-power state to unregister the removed VM. That is, the removed VM is removed from the inventory of a hypervisor 156 while hypervisor 156 is offline by accessing persistent files of hypervisor 156 using the platform management system 212.

Figure 7:
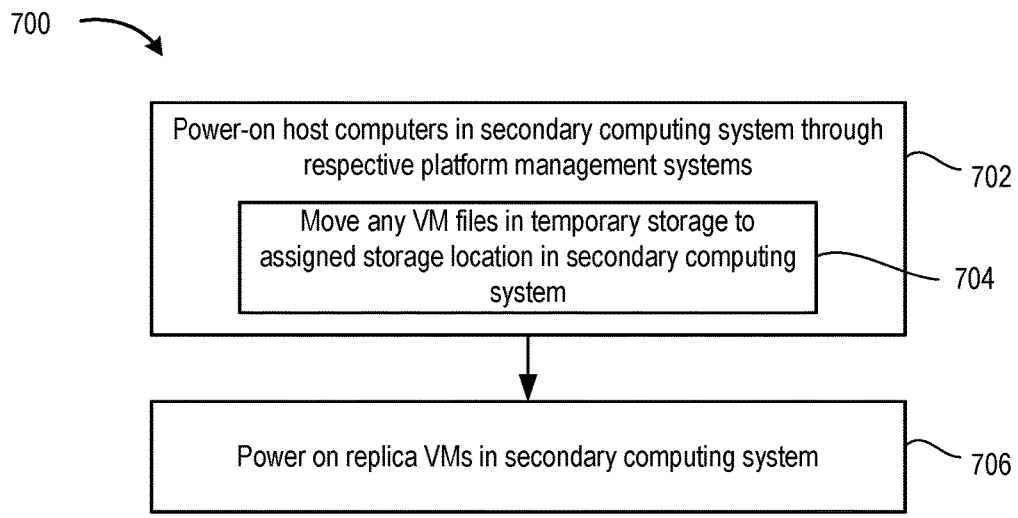
FIG. 7 is a flow diagram depicting a method of failover according to an embodiment.

FIG. 7 is a flow diagram depicting a method 700 of failover according to an embodiment. Disaster recovery manager 132 can, either alone or in combination with disaster recovery agent 166, perform method 600 to bring online the replicated virtualized computing environment in cloud computing system 150. Alternatively, another software application can, either alone or in combination with disaster recovery agent 166, perform method 600 in case disaster recovery manager 132 is offline due to failure in virtualized computing system 102 (e.g., in case of a disaster).

Method 700 begins at block 702, where disaster recovery manager 132 powers on host computers 162 in cloud computing system 150 through respective platform management systems 212. In some cases, when a host computer 162 is powered on, any VM files stored in temporary storage are moved to assigned storage during or after boot of a hypervisor 156 (block 704). At block 706, disaster recovery manager 132 activates VMs 172 in cloud computing system 150 that are replicas of VMs 120 protected in virtualized computing system 102.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of replication between computing systems, comprising:
   replicating virtual machine files from primary storage in a primary computing system to secondary storage in a secondary computing system; and
   replicating configuration data, from virtualization software in the primary computing system to secondary virtualization software installed on a host computer in the secondary computing system, through a platform management system in the host computer while the host computer is in a powered off state.

2. The method of claim 1, wherein the secondary virtualization software is not executing on the host computer when the host computer is in the powered off state.

3. The method of claim 1, wherein the step of replicating the configuration data comprises:
   connecting to the platform management system through a network interface; and
   modifying persistent files of the secondary virtualization software stored on a storage device in the platform management system.

4. The method of claim 3, wherein the step of modifying comprises:
   accessing at least one logical storage unit exported by a distributed file system service executing on a controller in the platform management system.

5. The method of claim 3, wherein the modified persistent files comprise a portion of a system image of the secondary virtualization software.

6. The method of claim 1, wherein configuration data includes information to configure the secondary virtualization software.

7. The method of claim 6, wherein the configuration data includes information to register a replica virtual machine with, or to de-register the replica virtual machine from, the secondary virtualization software.

8. The method of claim 1, wherein the configuration data includes information to configure a replica virtual machine registered with the secondary virtualization software.

9. The method of claim 1, further comprising:
   copying additional virtual machine files in the primary computing system to a temporary storage location in the secondary computing system; and
   configuring the secondary virtualization software, through the platform management system while the host computer is in the powered off state, to register a new replica virtual machine implemented by the additional virtual machine files.

10. The method of claim 9, wherein the temporary storage location comprises a temporary directory on a storage device in the platform management system.

11. A non-transitory computer-readable storage medium comprising instructions, which when executed in a computer system, causes the computer system to carry out a method of replication between computing systems, comprising:
    replicating virtual machine files from primary storage in a primary computing system to secondary storage in a secondary computing system; and
    replicating configuration data, from virtualization software in the primary computing system to secondary virtualization software installed on a host computer in the secondary computing system, through a platform management system in the host computer while the host computer is in a powered off state.

12. The non-transitory computer-readable storage medium of claim 11, wherein the secondary virtualization software is not executing on the host computer when the host computer is in the powered off state.

13. The non-transitory computer-readable storage medium of claim 11, wherein the step of replicating the configuration data comprises:
    connecting to the platform management system through a network interface; and
    modifying persistent files of the secondary virtualization software stored on a storage device in the platform management system.

14. The non-transitory computer-readable storage medium of claim 13, wherein the step of modifying comprises:
    accessing at least one logical storage unit exported by a distributed file system service executing on a controller in the platform management system.

15. The non-transitory computer-readable storage medium of claim 13, wherein the modified persistent files comprise a portion of a system image of the secondary virtualization software.

16. The non-transitory computer-readable storage medium of claim 11, wherein the configuration data includes information to register a replica virtual machine with, or to de-register the replica virtual machine from, the secondary virtualization software.

17. A computer system, comprising:
    a hardware platform including a central processing unit (CPU) and a computer-readable storage medium;
    management software comprising instructions stored on the computer-readable storage medium and executable by the CPU to:
    configure replication of virtual machine files from primary storage in a primary computing system to secondary storage in a secondary computing system; and
    configure replication of configuration data, from virtualization software in the primary computing system to secondary virtualization software installed on a host computer in the secondary computing system, through a platform management system in the host computer while the host computer is in a powered off state.

18. The computer system of claim 17, wherein the secondary virtualization software is not executing on the host computer when the host computer is in the powered off state.

19. The computer system of claim 17, wherein the management software is configured to replicate the configuration data by connecting to the platform management system through a network interface and modify persistent files of the secondary virtualization software stored on a storage device in the platform management system.

20. The computer system of claim 19, wherein the management software is configured to modify the persistent files by accessing at least one logical storage unit exported by a distributed file system service executing on a controller in the platform management system.

* * * * *